(12) United States Patent
Hood, III

(10) Patent No.: US 6,778,844 B2
(45) Date of Patent: Aug. 17, 2004

(54) SYSTEM FOR REDUCING MULTIPATH FADE OF RF SIGNALS IN A WIRELESS DATA APPLICATION

(75) Inventor: Charles D. Hood, III, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 602 days.

(21) Appl. No.: 09/770,542

(22) Filed: Jan. 26, 2001

(65) Prior Publication Data

US 2002/0147031 A1 Oct. 10, 2002

(51) Int. Cl.$^7$ ............................................. H04M 1/00
(52) U.S. Cl. .................................................. 455/562.1
(58) Field of Search ............................. 455/422.1, 403, 455/39, 517, 524, 562.1, 561, 575.7, 555, 272, 278.1; 370/338, 328, 404, 405

(56) References Cited

PUBLICATIONS

Ser. No. 09/426,232, filed Oct. 22, 1999, entitled "Site–to–Site Dynamic Virtual Local Area Network," by Richard Amberg, Eugene Baker, Dwayne Potter and Dennis Wiedeman, Pat. #6654347.

Ser. No. 09/492,030, filed Jan. 25, 2000, entitled "Wireless Communication Apparatus," by Erica Scholder and La Vaughn F. Watts, Jr., 6615360.

Ser. No. 09/491,485, filed Jan. 25, 2000, entitled "Wireless Communication Apparatus," by Erica Scholder and La Vaughn F. Watts, Jr., 6295197.

Ser. No. 09/774,838, filed Jan. 31, 2001, entitled "Computer System Including Multi–Channel Wireless Communication Link to a Remote Station," by Joseph Curley and Eric Swatzendruber.

Primary Examiner—Sonny Trinh
(74) Attorney, Agent, or Firm—Haynes and Boone, LLP

(57) ABSTRACT

In a wireless LAN, a technique for mitigating the effects of signal fading that results from multipath propagation. The wireless LAN includes a number of portable clients that, in one embodiment, may be notebook computers. An access point, or hub, couples the clients to a wired network and/or to each other. Multipath effects are mitigated in one embodiment by continually varying the radiation pattern of a transmitting antenna system associated with the access point. In one embodiment, the radiation pattern of a receiving antenna system is continually varied. Numerous approaches are provided to continually vary the radiation pattern of the respective antenna system, including, but not limited to, switching between two or more antennas in an array, adjusting the physical positioning of a single or multiple antennas, adjusting the effective length of the antenna, and adjusting the respective gain and/or phase of each of one or more of the signals coupled to antennas in an array.

15 Claims, 5 Drawing Sheets

SYSTEM FOR REDUCING MULTIPATH FADE OF RF SIGNALS IN A WIRELESS DATA APPLICATION

BACKGROUND OF THE INVENTION

The disclosure relates to wireless communications systems, and, more particularly, to a wireless LAN that includes at an access point a continually varying antenna array as a technique for mitigating the deleterious effects of multipath signal propagation.

1. Field of the Invention

The invention relates to wireless communications systems, and, more particularly, to a wireless LAN that includes at an access point a continually varying antenna array as a technique for mitigating the deleterious effects of multipath signal propagation.

2. Description of the Related Art

A wireless local area network (LAN) provides a flexible data communication system that may be implemented as an extension to, or as an alternative for, a wired LAN. Wireless LANs transmit and receive data using radio frequency (RF) communications techniques to thereby minimize the need for wired connections. In this manner, wireless LANs combine data connectivity with user mobility.

Wireless LANs have gained strong popularity in a number of vertical markets, including the health-care, retail, manufacturing, warehousing, and academia. These and other industries have profited from the productivity gains of using hand-held terminals and notebook computers to transmit real-time information to centralized hosts for processing. Today wireless LANs are becoming more widely recognized as a general-purpose connectivity alternative for use by a broad range of business customers. Observers have predicted a sixfold expansion of the worldwide wireless LAN market by yearend 2000, reaching more than $2 billion in revenues. The widespread reliance on networking in business and the meteoric growth of the Internet and online services are strong testimonies to the benefits of shared data and shared resources. Wireless LANs enable users to access shared information without the need to establish a hard-wired connection. Network managers have the option to create or augment networks without installing or relocating wires. Wireless LANs offer productivity, convenience, and cost advantages over traditional wired networks. Those advantages largely derive from speed, flexibility and simplicity of installation, reduced cost of ownership, and scalability.

For a thorough discussion of wireless LAN technology, see Jim Greer, *Wireless LANs: Implementing Interoperable Networks*, Macmillan Technical Publishing (1999), hereby incorporated by reference. In general, the implementation of wireless LANs may be based on one or more of a wide range of technologies, including:

Narrowband Technology. Narrowband wireless systems transmit and receive data or information on a specific radio frequency or within a specific narrow band of frequencies. Narrowband RF techniques strive to minimize the bandwidth necessary to transmit information. Undesirable crosstalk between communications channels is avoided by carefully coordinating different users on different channel frequencies. From an implementation perspective, a salient drawback of narrowband technology is that, in general, the end-user must obtain an FCC license for each site where the technology is employed.

Spread Spectrum Technology. Wireless LAN systems predominately use spread-spectrum technology, a wideband RF technique developed by the military for use in reliable, secure, mission-critical communication systems. Spread-spectrum techniques offer enhanced reliability, integrity, and security, at the expense of increased bandwidth. In other words, greater bandwidth is required than in the case of narrowband transmission. However, the tradeoff produces a signal that is, in effect, more robust and thus easier to detect, provided that the receiver is informed with the parameters of the spread-spectrum signal that is transmitted. If a receiver is not tuned to the correct frequency, a spread-spectrum signal appears as background noise. There are two fundamental types of spread spectrum technology: frequency hopping and direct sequence.

Freguency-Hopping Spread Spectrum Technology. Frequency-hopping spread-spectrum (FHSS) uses a narrowband carrier that changes frequency in a pattern known to both transmitter and receiver. Properly synchronized, the net effect is to maintain a single logical channel. To an unintended receiver, FHSS appears to be short-duration impulse noise.

Direct-Sequence Spread Spectrum Technology. Direct-sequence spread-spectrum (DSSS) generates a redundant bit pattern for each data bit that is transmitted. The bit pattern is called a chip, or chipping code. The longer the chip, the greater the probability that the original data can be recovered and, concomitantly, the greater the amount of the bandwidth required. Even if one or more bits in the chip are dropped in transmission, statistical techniques embedded at the receiver recover the original data without the need for retransmission. To an unintended receiver, DSSS appears as low-power, wideband noise and is rejected (ignored) by most narrowband receivers.

Infrared Technology. Infrared (IR) represents a third available technology, albeit little used in commercial wireless LANs. IR systems use very high frequencies, immediately below visible light in the electromagnetic spectrum, to carry data. As is the case with light, IR cannot penetrate opaque objects and is, therefore, either directed (line-of-sight) or diffuse technology. Inexpensive directed systems provide very limited range (three feet) and typically are used for personal area networks, but are occasionally used in specific wireless LAN applications. High performance directed IR is impracticable for mobile users and is therefore used only to implement fixed sub-networks. Diffuse (or reflective) IR wireless LAN systems do not require a line-of-sight transmission path, but cells are limited to individual rooms.

In a typical wireless LAN configuration, a transmitter/receiver (transceiver) device, called an access point or, alternatively, a hub, connects to the wired network from a fixed location using standard cabling. At a minimum, the access point receives, buffers, and transmits data between the wireless LAN and the wired network infrastructure. A single access point can support a small group of users and can function within a range of less than one hundred to several hundred feet. The access point, or the antenna attached to the access point, is usually elevated, but may be mounted essentially anywhere that is practicable, as long as the desired transmission coverage is obtained.

End users access the wireless LAN through wireless LAN adapters. Wireless LAN adapters are implemented as PCM-CIA cards in notebook or palmtop computers, or as cards in desktop computers, and may be integrated within hand-held computers. Wireless LAN adapters provide an interface between the client network operating system (NOS) and the transmission medium via an antenna. The nature of the wireless connection is transparent to the NOS.

Wireless LANs can range from simple to complex in both design and operation. At its most basic, two PCs equipped with wireless adapter cards can establish an independent network whenever they are within range of one another. Such a network is generally referred to as a peer-to-peer network. Ad hoc peer-to-peer "networks" require no administration or preconfiguration. In this case, each client will have access only to the resources of the other client, but not to a network server or host computer.

Installing an access point can extend the range of an ad hoc network, effectively doubling the range at which the devices can communicate. Because the access point is connected to the wired LAN, each client is afforded access to server resources as well as to other clients. Each access point has the capacity to accommodate many clients, the specific number of clients depending on the number and nature of the transmissions involved. Many applications exist in which a single access point services from 15–50 client devices.

Access points have a finite range, on the order of 500 feet indoors and 1000 feet outdoors. In a very large facility, such as a warehouse or a college campus, more than one access point may be indicated. Access point positioning is accomplished by means of a site survey. The objective is to blanket the intended coverage area with overlapping coverage cells so that clients are free range throughout the area without losing network contact. The ability of clients to move seamlessly among a cluster of access points is called roaming. Access points often are designed to hand the client off from one to another in a way that is invisible to the client, thereby ensuring uninterrupted connectivity.

Although, as may be gleamed from the above, wireless LANs offer significant operational advantages, wireless LAN technology is challenged by a number of phenomena. In particular, high-speed wireless LAN transceivers, such as those intended to be compliant with the IEEE 802.11(b) standard, require consistent strong signal in order to maintain high data throughput. In an office environment, the RF signal traveling between a client device (such as a notebook computer) and an access point (base station) will likely reflect off many objects and surfaces, including walls, office furniture, and inhabitants, in route to the receiving antenna. Due to the density of obstructions in an office environment, it is likely that a signal will reach the receiving antenna through multiple paths. Because of the resulting difference in path length, disparate signals may arrive at the receiving antenna with randomly variant phase relationships. That is, different versions of the same signal will exhibit correspondingly different phase shifts in transmission between the access point and the portable client. This can result in a phenomenon known as multipath fading, or multipath distortion, which is primarily manifested as a time-varying signal amplitude at a receiver, in this instance, at a portable client. In fact, the IEEE 802.11(b) standard contemplates the adjustment of transmitted data rate in response to variations in received signal strength indication (RSSI), such as may result from multipath fading.

In an office environment with a stationary access point, there will exist areas of weak or null signal. These areas of signal nulls commonly result from multipath fading phenomena, in which randomly phased signals travel different paths from the access point and effectively tend to cancel one another at the client. They are, accordingly, sometimes colloquially referred to as "fade bubbles". Fade bubbles predictably increase in size with distance from the access point. If the transmitter (access point) and receiver (client computers) are both stationary, as in the situation, for example, where a notebook computer is placed on a table in a conference room and is communicating with a stationary access point in the building, a condition may arise in which the signal strength at the receiver is inadequate to enable transmission of data at the specified maximum rate, or at all, until the user relocates the receiver (computer) to a different location.

Even in situation where both the receiving device and transmitting device are stationary, the bubbles of signal minima drift unpredictably if inhabitants or structures in the environment are continually or randomly in motion. This effect can fortuitously, but randomly, improve the throughput of a device that is sitting in a fade bubble as described above.

A method commonly employed as a response to multipath distortion involves the use of at least two antennas, with physical separation and/or RF isolation due to cross polarization. The antennas are then said to be spatially diverse, and the technique is commonly referred to as a diversity antenna system. The intended effect is that because the transmitted signal emanates from two antennas, it will travel along two different paths and, presumably, by subjected to different degrees of multipath fading. In this case, the receiver measures signal strength from both antennas and selects the antenna when the RSSI or signal-to-noise ratio (SNR) falls below a threshold. This method is effective when the separation between antennas is sufficient so that at least one antenna will likely be outside the fade bubble, thereby obviating the need to relocate the receiver. However, the implementation of diversity antennas in this manner increases the cost and complexity to the notebook computer design. Furthermore, the effectiveness of diversity antennas remains limited when the size of the fade bubbles become large with respect to the antenna separation.

Accordingly, what is desired is an approach to the mitigation of multipath fading phenomena in wireless LAN environments. A preferred approach will tend to minimize the cost and complexity of the design, manufacture and operation of wireless LAN client devices, such as notebook computers, PDAs and the like. In addition, it is desired that the approach be effective in circumstances where the client device is deployed in a substantially fixed, or perhaps narrowly circumscribed, location, such as in a conference room.

In accordance with one aspect of the disclosure, an acceptable solution is susceptible of implementation in a variety of ways. One approach is to use a single transmitting antenna at the access point and physically translate or rotate the antenna continually. Typically access points in use today have dual ½-wave dipole antennas connected through a customer-accessible coaxial connector. Generally the access point will switch the receiver between the two antennas to maximize received signal strength. Generally, only one antenna will be used for transmitting. With this configuration, the transmitting antenna could be rotated 360 degrees by a motor or could reciprocate continually, in the manner of a windshield wiper. An advantage of this scheme is that it may be made available as a customer-installable option.

Although the above approach is viable and should result in good performance, it does require moving parts and therefore may result in the generation of audible and electrical noise, and may also be susceptible to mechanical wear and tear. Another approach would be to attach an array of antennas to the access point and electrically switch between the antennas periodically. If the antennas have different polarization and radiation pattern characteristics, the desired effect of moving the fade bubbles can be accomplished with only a small spacing between the antennas. This suggests that the device could remain quite small.

SUMMARY

The above and other objects, advantages and capabilities are achieved in one aspect of the disclosure by a wireless communications system, such as a wireless LAN, that comprises a plurality of client devices. In one embodiment, the client devices are portable computers that include a transceiver for transmitting and receiving a wireless communication signal. The wireless communications system also comprises an access point (alternatively referred to as a "hub") that similarly incorporates a transceiver that is coupled to an antenna array. An antenna controller is coupled to the antenna array and operates to cause a substantially continual variation in the radiation pattern of the antenna array during periods when the access point is transmitting. Continual variation of the radiation pattern of the transmitting access point antenna mitigates the effects of multipath fading by assuring that a stationary client will not be permanently positioned in a signal bubble area, that is, in an area of signal minima.

Another aspect of the disclosure is embodied in a method of mitigating the effects of multipath signal propagation in a wireless LAN. The method is characterized by substantially continually varying the radiation pattern of an antenna system in the course of the transmission of a wireless signal from an access point to a client. The disclosure comprehends numerous techniques for varying the antenna radiation pattern, including, but not limited to, varying the physical position or orientation of the antenna system, switching between antennas of two or more different types, varying the length of one or more antennas in the antenna system, and varying the gain and/or phases of signals applied to antennas in the antenna system.

In another aspect of the disclosure, a computer system comprises at least one portable computer, a network server, and an access point that is coupled to the network server via a wired communications link and that is coupled to the portable computer via a wireless communications link. An antennas system, including one or more antennas, is coupled to the access point, and an antenna controller is coupled to the antenna system. The antenna controller operates to cause the radiation pattern of the antenna system to continually vary during the transmission of a wireless signal from the access point to the portable computer, and, in so doing, mitigates multipath signal propagation effects.

In a further aspect, the disclosure may be exploited in a wireless LAN as a method of mitigating the effects of multipath signal propagation between an access point and a receiving client. In accordance with the method, a wireless signal is transmitted from the access point to the receiving client and, contemporaneously, the radiation pattern of an antenna system is continually varied.

As an additional ramification of the disclosure, an antenna system constituent in a wireless LAN is operable to continually vary the radiation pattern imparted to a wireless signal that is caused to propagate from an access point to a client. The antenna system comprises an antenna array coupled to the access point. An antenna controller is coupled to the antenna array so as to continually vary the radiation pattern of the antenna so that even a substantially stationary client is assured to avoid permanent placement in a position of a signal null that results from multipath propagation.

In a still further embodiment, the disclosure is implemented in a computer system that includes a client device coupled to a source of networked resources. A communications device is coupled to the client device via a wireless first communications link and is coupled to the source of networked resources through a second, likely wired, communications link. An antenna system is coupled to the communications device in a manner that enables the communications device to transmit signals to, and to receive signals from, the client device. The antenna system is coupled to control means for varying the radiation pattern of the antenna system as signal is transmitted from the communications device to the client device.

BRIEF DESCRIPTION OF THE DRAWINGS

The subject invention may be better understood, and its numerous objects, features, and advantages made apparent to those skilled in the art, be reference to the following Drawings, in which.

The use of the same reference symbols in repeated instances, regardless whether in the same or in difference Drawings, is intended to indicate similar or identical elements.

DETAILED DESCRIPTION

For a thorough understanding of the subjection invention, reference is made to the following Description, including the appended Claims, in connection with the above-described Drawings.

Figure 1:
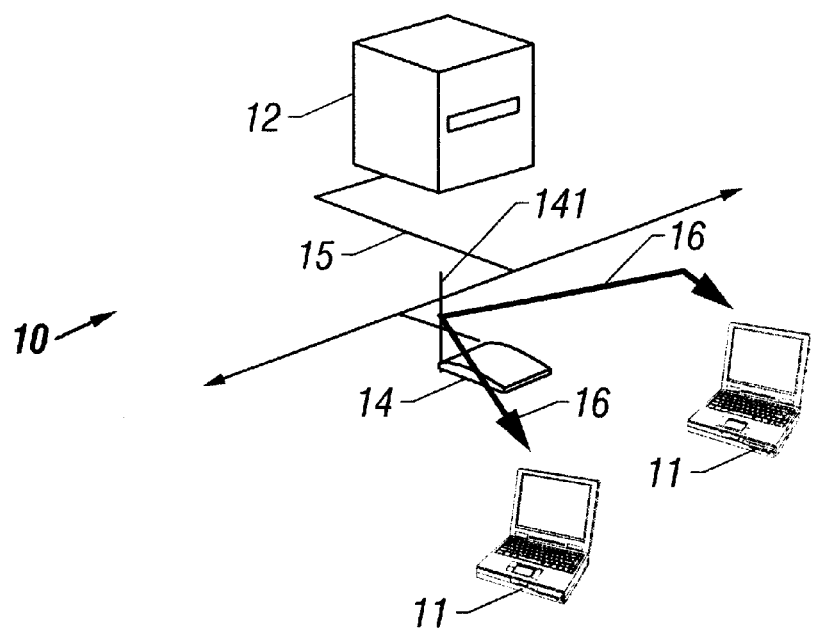
FIG. 1 is a system block diagram of a typically configured wireless LAN in which portable computer clients are coupled by a wireless communications link to an access point. The access point is, in turn, coupled by a wired link to a network server or other networked resource.

Referring now to FIG. 1, as depicted therein, in one embodiment of the invention there may be seen a computer system 10 comprising a plurality of portable computers 11. The portable computers may be any one of an assortment of numerous types, including but not limited to notebook computers, laptop computers, personal digital assistants (PDAs), palm pilots, or the like. The portable computers are clients of and, in a manner to be described below, coupled to a network server 12. In a manner well understood in the art, the server is accessible on a LAN 13 and operates to run administrative software that controls access to the LAN and to other resources available on the LAN, such as printers, disk drives and the like (not shown). The server may also contain resources that are made available to the client computers.

The computer system depicted in FIG. 1 also includes an access point 14 that may be alternatively referred to as a "hub". The access point is coupled to the network server via a wired communications link 15 and is coupled to the portable computer clients via a wireless communications link 16. That is, access point 14 operates to transmit to, and receive from, portable clients 11 a wireless signal by virtue of an associated antenna 141. From another perspective, wireless communications link 16 may be viewed as the aggregation of the separate links 16a, 16b, . . . , etc. that are established at the same or different times between the access point and each of the portable clients. In one embodiment of the invention, the wireless communications link between and including the access point 14 and client computers 11 conforms to the current version of IEEE 802.11b standard.

The access point may be one of the known and commercially available products, such as, for example, the Cisco Aironet 340 Series Access Point. That product is characterized by the following specifications:

| | |
|---|---|
| Data Rates Supported | 1, 2, 5.5 and 11 Mbps |
| Network Standard | IEEE 802.11b |
| Frequency Band | 2400–2486.5 MHz |
| Wireless Medium | DSSS |
| Media Access Protocol | CSMA/CA |
| Network Operating Systems Supported | Microsoft Windows 2000, 98, 95, NT and CE |
| Modulation | DBPSK @ 1 Mbps |
| | DBPSK @ 2 Mbps |
| | CCK @ 5.5 and 11 Mbps |
| Operating Channels | 11 channels |
| Simultaneous Channels | Three |

Other vendors of wireless LAN access points include Nortel Networks, Lucent Technologies, Sony Electronics, Inc., Intermec Technologies Corp, Cabletron Systems, Max-Tech Corp., Symbol Technologies, BreezeCOM, and others. Many, if not all, the above vendors also distribute PCMCIA wireless LAN circuit cards that are installed in the portable computers in order to enable the portable computers to participate in wireless communications with the access point.

Figure 2:
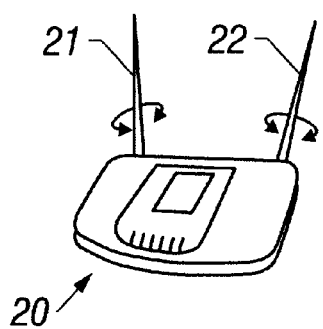
FIG. 2 is an illustration of an access point that incorporates a spatial diversity antenna system in which at least one antenna is manually rotatable about an axis that is orthogonal to the direction in which the antenna extends.

Many commercially available access points, such as the 340 Series alluded to above, exhibit dual antennas. In some products, both antennas are operative when the access point is receiving a signal, and only one of the two is operative when the access point is transmitting. The dual antenna configuration is primarily intended to effect a diversity antenna system that counteracts the effect of multipath signal propagation. That is, because the antennas are physically separate, the signal path between the access point and a client differs in aggregate distance, including reflections, between the two antennas. This technique is referred to in the art as spatial diversity. Inevitably, one of the antennas will present a stronger, or otherwise preferable, signal. In an antenna system with spatial diversity, the signal at the preferred antenna may be selected and the other signal ignored or squelched. In fact, some access points include not only an antenna system that exhibits spatial diversity, but also permit the antenna to rotate about the point of connection with the access point. An example of such a configuration is seen in FIG. 2. As may be seen therein, an access point 20 includes a pair of spatially diverse (that is, physically separated) antennas 21 and 22. Each of the antennas is coupled to the access point in a manner that allows manual rotation of the antennas about a virtual axis that extends horizontally, that is, in a direction orthogonal to an axis that extends the length of the antennas. In this manner, rotation of one or both of the antennas may be adjusted so as to adjust the radiation pattern of the antenna(s) and thereby optimize the signal received or transmitted by the access point.

In an additional, or alternative, effort to mitigate the deleterious effects of multipath signal propagation, antenna diversity may be incorporated into the client computer. Consonant with this approach, wireless LAN adapter card that is inserted into the portable client may include dual antennas that similarly exhibit spatial diversity. In such a system, two spatially diverse antennas are printed on the adapter card. One antenna is selected for operation based on the RSSI or some other metric, for example SNR, that is deemed to quantify the quality of the communications link between the access point and the client. Of course, this technique requires additional signal processing to determine, at any point in time, which antenna is receiving the preferred signal.

Figure 3:
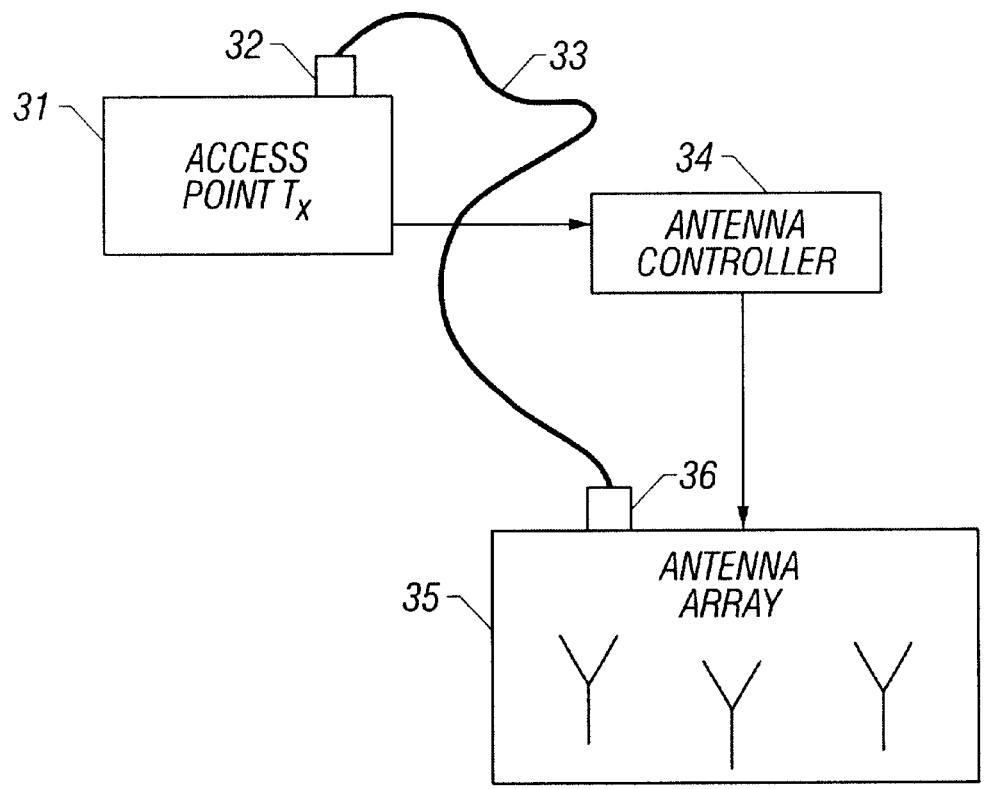
FIG. 3 is a block diagram of an access point in accordance with an embodiment of the invention. The access point is coupled to an antenna array. The antenna array is coupled to antenna controller that causes the radiation pattern of the array to vary continually.

In accordance with the disclosure, an improved technique for mitigating the effect of multipath signal propagation is illustrated in FIG. 3. FIG. 3 depicts an access point 31 that is coupled to an antenna array 35. Typically, the access point will be coupled to antenna array 35 through a connector 32, a coaxial cable 33, and a connector 36 at the antenna array. The antenna array may include one or more individual antennas. Three are shown in FIG. 3. Operation of the antenna array is controlled by an antenna controller 34 coupled to the antenna array, as depicted in FIG. 3. Numerous forms of antenna arrays are contemplated by the disclosure. The design and operation of the antenna controller will consequently vary, in accordance with techniques understood by those skilled in the art. Specifically, antenna controller and antenna array cooperate so that the radiation pattern of the antenna array is caused to continually vary. In this manner, the characteristics of the signal at the location of the client portable computer are likewise continually varying. In one embodiment, a $T_x$ signal that is available at access point 32 indicates that the access point is in a transmit-data mode. The $T_x$ signal may be coupled to the antenna controller to enable operation of the antenna controller only when the access point is transmitting.

Figure 5A:
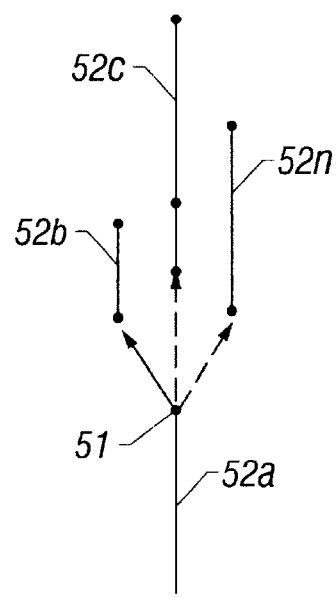
FIGS. 5A and 5B depict an embodiment of the invention in which the radiation pattern of the antenna array is varied by adjusting the length of at least one antenna in the array (FIG. 5A) or by selectively switching between two or more antennas of different lengths or shapes.
Figure 5B:
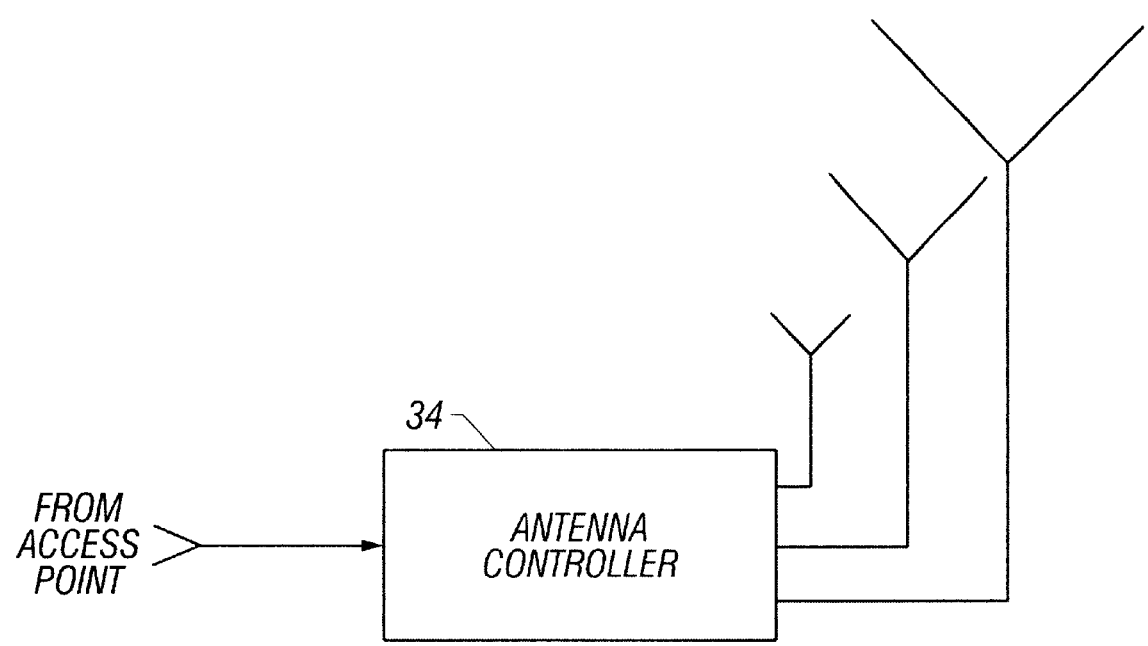
Figure 6:
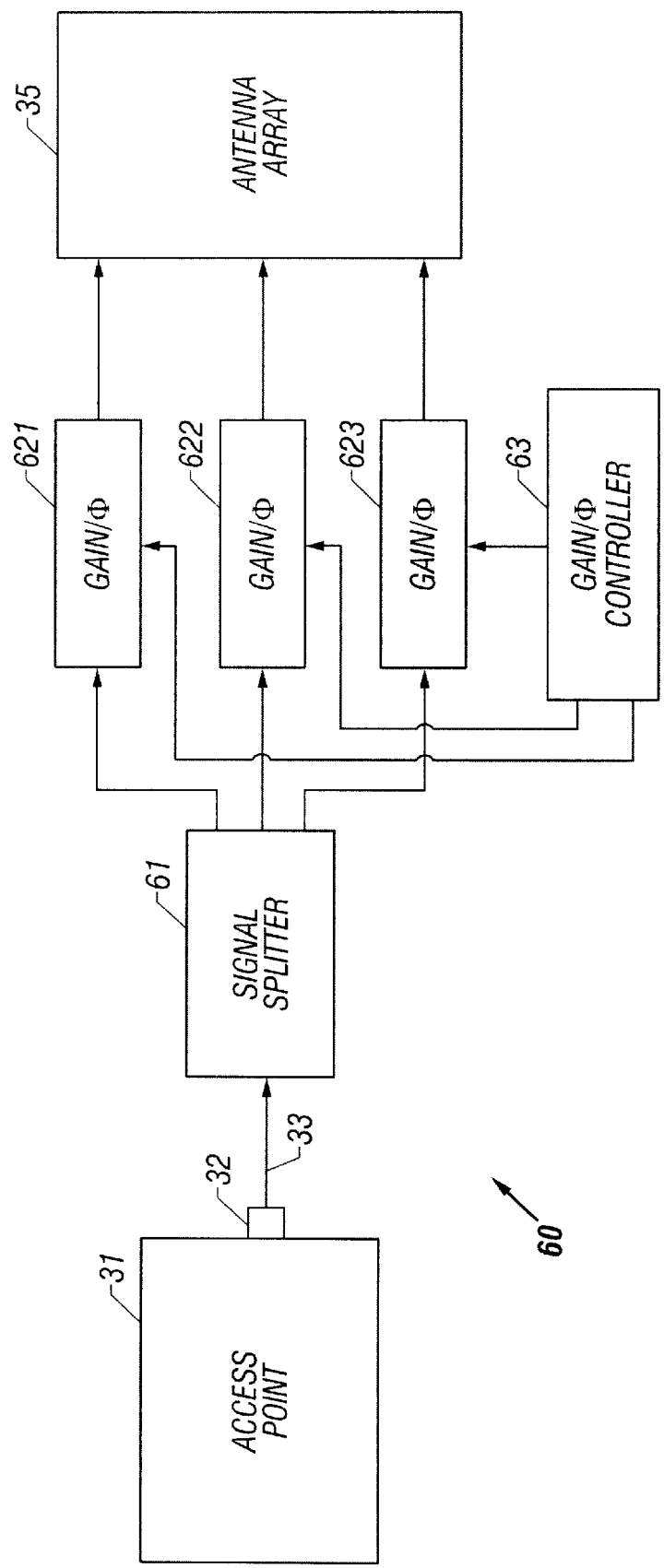
FIG. 6 depicts an embodiment of the invention in which the radiation pattern of an antenna array is varied by varying the gain and/or phase of signal(s) coupled to one or more antennas in the array.

A number of exemplary approaches to the implementation of an antenna system are depicted in FIGS. 4, 5, and 6. It is to be understood, however, that the techniques illustrated in those FIGUREs are not exhaustive. Practitioners will understand that the invention extends to any implementation in which the radiation pattern of an antenna system is caused to continually vary, thereby ameliorating the effects of multipath propagation and attendant signal fading phenomena.

FIG. 4 depicts an implementation in which the radiation pattern of an antenna system is caused to vary as result of the variation of the physical position and/or orientation of an antenna system, or a single antenna.

Figure 4A:
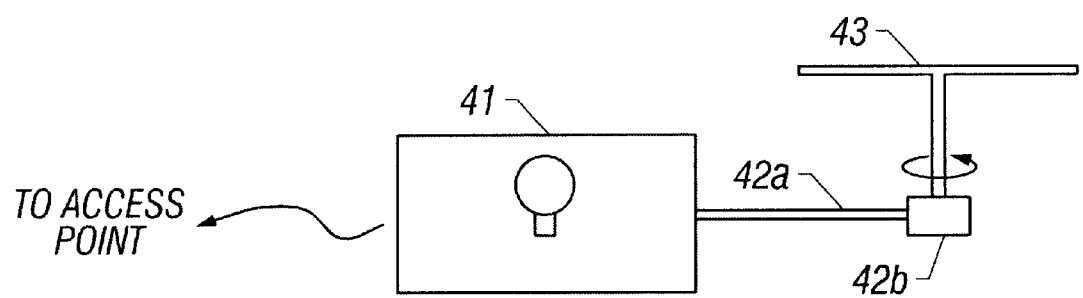
FIGS. 4A, 4B, and 4C depict embodiments in which the radiation pattern of the antenna array is varied by manipulation of the physical position of at least one antenna in the array.

In the embodiment of FIG. 4A, the antenna system consists essentially of a single antenna 43, which may be a dipole antenna. The dipole antenna is coupled to the access point through a connector and cable arrangement (not shown). An antenna controller, in the form of a motor 41, is mechanically coupled, through a coupling mechanism illustrated as elements 42a and 42b, to the shaft of a dipole antenna 43. The motor is actuated when the access point is operating in the transmit mode and, when so actuated, causes the antenna to rotate about an axis defined by the antenna shaft. Of course, as the antenna rotates about the vertical axis defined by the antenna shaft, the radiation pattern of the antenna continually varies. Similarly, the quality of the signal received by the client computer will likewise vary in response to variation in the antenna radiation pattern.

It is worthy of note that control of the antenna radiation pattern as described above is open-loop in nature. That is, the antenna is caused to rotate independent of any information derived from the quality of signal actually present at the client. Consequently, the signal at the client input can be expected to continually vary between a relative signal minima, in which the client input signal is relatively least effective, and a relative maxima, in which the client input signal is relative most effective. SNR, BER or packet error rate will be directly related. The end result is that the distant client (on the fringe of a coverage area) will achieve data throughout that is a fraction of the network's optimal capability. However, for data applications this situation may be relatively transparent to the user, and is much preferred to a situation in which data transmission is entirely impeded. The described operation is in contrast to the operation of known diversity antenna systems or antenna steering systems, the operation of which is generally predicated on the selection of a "best" signal from one or more available signals, or on the optimization of the radiated signal in response to feedback derived from the received signal. Those techniques necessarily requiring a signal processing, and associated circuit complexity, that is not required by the subject disclosure. However, by continually varying the radiation pattern of the antenna, the subject disclosure assures that a client device avoids a situation in which the device is, for an extended duration, fixed in a location, such as a conference room, that corresponds to a signal null, or "bubble", as referred to above.

Figure 4B:
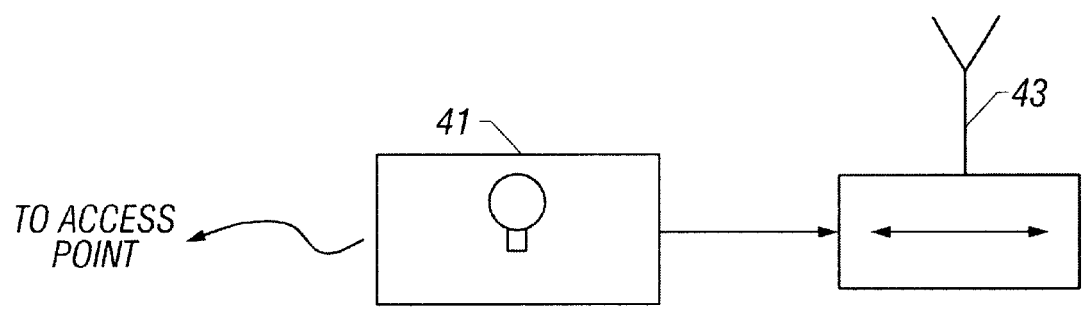

FIG. 4B illustrates another approach to the variation of an antenna radiation pattern through manipulation of the physical position and/or orientation of an antenna system. In the embodiment of FIG. 4B, the antenna position is again driven by a motor 41, but in this instance the antenna travels a substantially linear path between the extremities of a linear track on which the antenna is supported.

Figure 4C:
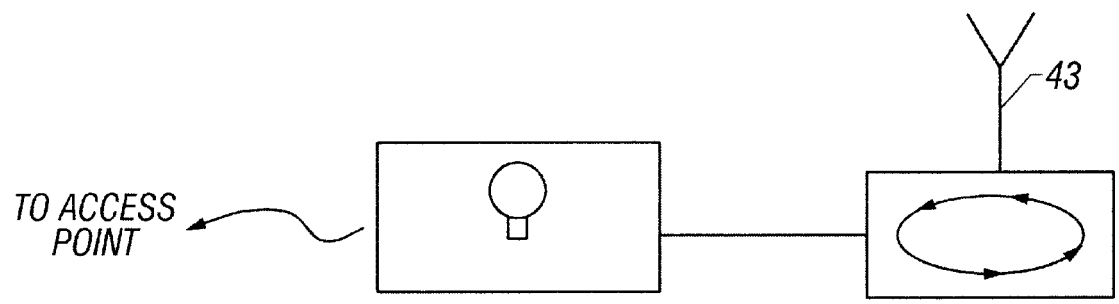

In FIG. 4C, the antenna is shown mounted on a carousel, and as the carousel rotates about its axis, the antenna is caused to travel a substantially circular path. Again, the radiation pattern of the antenna varies in response to the instantaneous position of the antenna.

FIG. 5 is directed to a technique in which the radiation pattern of the antenna system is continually varied during an access point transmission by varying the length of an operative antenna in the antenna system. In FIG. 5A, the length of an antenna is varied by sequentially adding an incremental length, or lengths, of antenna to a fixed length. The antenna controller in this embodiment comprises a switch 51 that selectively and sequentially connects incremental antenna length(s), 52b, 52c, ..., 52n, to the fixed length 52a. The antenna controller switch may take the form of an electromechanical, mechanical, or electronic switch. Electronic switches at RF may be realized through the use of PIN diodes or microelectromechanical systems.

FIG. 5B illustrates an embodiment according to which the antenna length is varied through the operation of an antenna controller that selectively switches between two or more antennas of different lengths.

FIG. 6 illustrates an embodiment in which the radiation pattern of an antenna array is varied by varying the gain and/or phase applied to a signal that is then coupled to individual antennas in an antenna array. In this embodiment, the antenna controller is implemented as a gain/phase controller that adjusts the gain and phase of a signal and couples disparate gain- and phase-adjusted signals to individual antennas in an antenna array. For a discussion of applicable design approaches, known to those skilled in the art of antenna system design, see Garrett T. Okamoto, *Smart Antenna Systems and Wireless LANs*, Kluwer Academic Publishers (1998), hereby incorporated by reference in its entirety.

With specific reference now to the embodiment exemplified in FIG. 6, it may be seen that the transmittal signal output, $T_x$, at access point 31 is coupled through connector 32 and coaxial cable 33 to a gain/phase controller 60 that may include a signal splitter 61, a number of gain/phase modules 621, 622, and 623, and a gain/phase controller 63. The output of gain/phase controller 60, at the outputs of gain/phase controller 60, at the outputs of gain/phase modules 621, 622, and 623, is coupled to an antenna array 35.

Specifically, the $T_x$ output of access point 31 is coupled to an input of signal splitter 61. Signal splitter 61 provides at its out a number of replicates of signal $T_x$. For strictly pedagogical purposes, signal splitter 61 is shown to provide three output, but the invention contemplates any number greater than one. Signal splitter 61 may include active devices, but may be constructed from discrete or dumped passive elements. It is likely preferred, but not required, that the outputs of signal splitter 61 be maintained substantially identical in amplitude and phase.

The outputs of signal splitter 61 are coupled to respective inputs of gain/phase (gain/Φ) modules 621, 622, and 623. Again, three gain/Φ modules are illustrated in FIG. 6, but the invention is not to be understood as restricted to a number certain of gain/Φ modules.

In accordance with any appropriate one of numerous known techniques, gain/Φ controller 63 operates to continually vary the gain and/or phase applied by the gain/Φ elements to the respective outputs of signal splitter 61. As a result, the $T_y$ output at the access point is decomposed into, for example, three separate signals. In a manner determined by gain/Φ controller 63, gain and or phase adjustments are made to the separate signals. Gain/Φ controller 63 is designed, either through operation of constituent hardware or under software program control, or a combination of both, to continually vary the gain and/or phase adjustments applied to each of the signals. Embodiments contemplate that each of the separate signals experience either or both gain and phase adjustments, at the discretion of the system designer or as required by externalities. The salient result being that, whatever the precise nature of the adjustments made to the separate outputs of signal splitter 61, the output of gain/phase control system 6, which is the composite of the signals at gain/Φ modules 621, 622, and 623, is applied to individual antenna(s) (not shown) in antenna array 35 in a manner that results continual variation in the radiation pattern that is associated with the antenna array.

Accordingly, from the above, it may be seen that the disclosure, in its numerous embodiments, affords is straightforward approach to the problem of multipath signal fading in the context of wireless LAN systems. In general, the solution includes continually varying the radiation pattern of an antenna system that is associated with the access point.

Of course, physically moving antenna elements in the antenna system, or otherwise modifying the antenna system radiation pattern continually, does not result in operation in which the fade bubbles will necessarily be eliminated. However, it is insured that the bubbles will always be moving, thereby virtually ensuring that a stationary computer within the rated system range of the system will avoid complete loss of service because of multipath fading.

In another approach to implementation of at least one aspect, an antenna array may comprise a number of distinct antennas, each of which exhibits a characteristic radiation pattern that respectively differs from the radiation patterns exhibited by other antennas. This may be accomplished by providing antennas of different types or configurations, such as, but not limited to a loop antenna, a dipole antenna, a folded dipole antenna, a whip antenna, a log periodic antenna, and the like. The antenna controller is then interposed between the access point and the antenna array and operates to selectively sequentially connect the signal to be transmitted at the access point to one antenna in the array. Subsequently, the signal is decoupled from the first antenna and then coupled seriatim to each of the other antennas, so that the effective radiation pattern of the array continually varies, at least during the transmit cycle of the access point.

From the above Description, it may be readily apprehended that the salient characteristic of the disclosure is the mitigation of the consequences of multipath fading by varying the radiation pattern of an antenna system associated with an access point, or equivalent hub, in a wireless data transmission system. In one embodiment, the variation is designed to be substantially continual, at least during transmitting session engaged in by the access point. However, in the context of the above Description, continual variation of the radiation pattern is to mean only that the radiation pattern of the antenna system does not remain constant, that is, varies, through at least a substantial portion of the transmitting session. In fact, the variations may be discrete or discontinuous, as when operation is switched between two antennas with distinctly different radiation patterns. In this regard, it should be understood that the radiation pattern will be deemed to vary continually if, for example, the duty cycle of each antenna is substantially less than the duration of a client session and at least one antenna is operating at any time during the session.

Accordingly, although an exemplary embodiment has been described in detail herein, those possessed with ordinary skill in the art will readily apprehend various changes and modifications in form and detail to the subject matter so described, without departure from the spirit and scope of the disclosure. Consequently, the scope of the disclosure is not properly delimited by the above Description, but is to be established with reference to the appended Claims, and equivalents thereto.

What is claimed is:

1. A computer system comprising:
   a portable computer;
   a network server;
   an access point coupled to the network server via a wired communications link and coupled to the portable computer via a wireless communications link;
   an antenna system coupled to the access point; and
   an antenna controller coupled to the antenna system for continually varying the radiation pattern of the antenna system while a wireless signal is transmitted from the access point to the portable computer, the antenna controller comprising:
   a signal splitter having an input coupled to a signal provided by the access point for transmission to the client and having a plurality of outputs;
   a plurality of gain/phase modules, each of the gain/phase modules having a signal input coupled to an output of the signal splitter and having an output; and
   a gain/phase controller having a plurality of outputs, each respective coupled to a control input of one of the gain/phase modules, the gain/phase controller for adjusting the gain and/or phase imparted to the signals applied to the signal inputs of the gain/phase modules.

2. A computer system as defined in claim 1, wherein the antenna controller varies the radiation pattern of the antenna system by varying the physical position of an antenna in the antenna system.

3. A computer system as defined in claim 1, wherein the antenna controller varies the radiation pattern of the antenna system by varying the physical orientation of an antenna in the antenna system.

4. A computer system as defined in claim 3, wherein the antenna controller rotates an antenna in the antenna system about an axis of the antenna.

5. A computer system as defined in claim 1, wherein the antenna controller varies the length of an antenna in the antenna system.

6. A computer system as defined in claim 1, wherein the antenna controller varies the gain and/or phase of a signal to be applied to at least one antenna included in the antenna system.

7. A computer system comprising:
   a client device;
   a communications device coupled to the client device via a wireless first communications link and coupled to a source of networked resources via a second communications link;
   an antenna system coupled to the communications device in a manner that enables the communications device to transmit signals to and to receive signals from the client device; and
   control means comprising an antenna controller coupled to the antenna system for varying the radiation pattern of the antenna system as information is transmitted from the communications device to the client device, the antenna controller comprising:
   a signal splitter having an input coupled to a signal provided by the communications device for transmission to the client and having a plurality of outputs;
   a plurality of gain/phase modules, each of the gain/phase modules having a signal input coupled to an output of the signal splitter and having an output; and
   a gain/phase controller having a plurality of outputs, each respective coupled to a control input of one of the gain/phase modules, the gain/phase controller for adjusting the gain and/or phase imparted to the signals applied to the signal inputs of the gain/phase modules.

8. A computer system as defined in claim 7, wherein the control means operates to vary the radiation pattern of the antenna system by continually varying the spatial orientation of at least an antenna in the antenna system.

9. A computer system as defined in claim 7, wherein the control means operates to vary the radiation pattern of the antenna system by sequentially selecting one or more antennas for operation from an array of antennas that individually exhibit mutually different radiation patterns.

10. A computer system as defined in claim 7, wherein the control means operates to vary the radiation pattern of the antenna system by continually varying the gain and/or phase of a signal that is applied to at least one antenna in the antenna system for transmission to the client device.

11. A computer system as defined in claim 7, wherein the antenna controllers is coupled to the communications device to receive a $T_x$ signal that indicates that the communications device is engaged in a transmitting session.

12. A computer system as defined in claim 11, wherein the antenna system consists essentially of a single antenna and wherein the antenna controller operates to cause the radiation pattern of the antenna to vary continually during a transmitting session by continually varying the spatial orientation of the antenna.

13. A computer system as defined in claim 12, wherein the antenna controller effects open-loop control of the radiation-pattern of the antenna system.

14. A computer system as defined in claim 7, wherein the antenna system comprises a plurality of antennas, each of which is characterized by a respective radiation pattern, and wherein the antenna controller is coupled to the communications device to receive a $T_x$ signal that indicates that the communications device is operating in a transmit mode.

15. A computer system comprising:

a client device;

a communications device coupled to the client device via a wireless first communications link and coupled to a source of networked resources via a second communications link;

an antenna system coupled to the communications device in a manner that enables the communications device to transmit signals to and to receive signals from the client device;

control means coupled to the antenna system for varying the radiation pattern of the antenna system as information is transmitted from the communications device to the client device;

the antenna system comprising a plurality of antennas, each of which is characterized by a respective radiation pattern;

the control means comprising an antenna controller that is coupled to the communications device to receive a $T_x$ signal that indicates that the communications device is operating in a transmit mode, the antenna controller comprising:

a signal splitter having an input coupled to a signal provided by the communications device for transmission to the client and having a plurality of outputs;

a plurality of gain/phase modules, each of the gain/phase modules having a signal input coupled to an output of the signal splitter and having an output; and a gain/phase controller having a plurality of outputs, each respective coupled to a control input of one of the gain/phase modules, the gain/phase controller for adjusting the gain and/or phase imparted to the signals applied to the signal inputs of the gain/phase modules.

* * * * *

UNITED STATES PATENT AND TRADEMARK OFFICE
CERTIFICATE OF CORRECTION

PATENT NO. : 6,778,844 B2
DATED : August 17, 2004
INVENTOR(S) : Charles D. Hood, III It is certified that error appears in the above-identified patent and that said Letters Patent is hereby corrected as shown below:

<u>Column 1,</u>
Delete lines 6 through 19 and insert the following therefor:

-- BACKGROUND

The disclosure relates to wireless communications systems, and, more particularly, to a wireless LAN that includes at an access point a continually varying antenna array as a technique for mitigating the deleterious effects of multipath signal propagation. --

Signed and Sealed this

Twenty-first Day of December, 2004

JON W. DUDAS
*Director of the United States Patent and Trademark Office*